Patented May 7, 1946

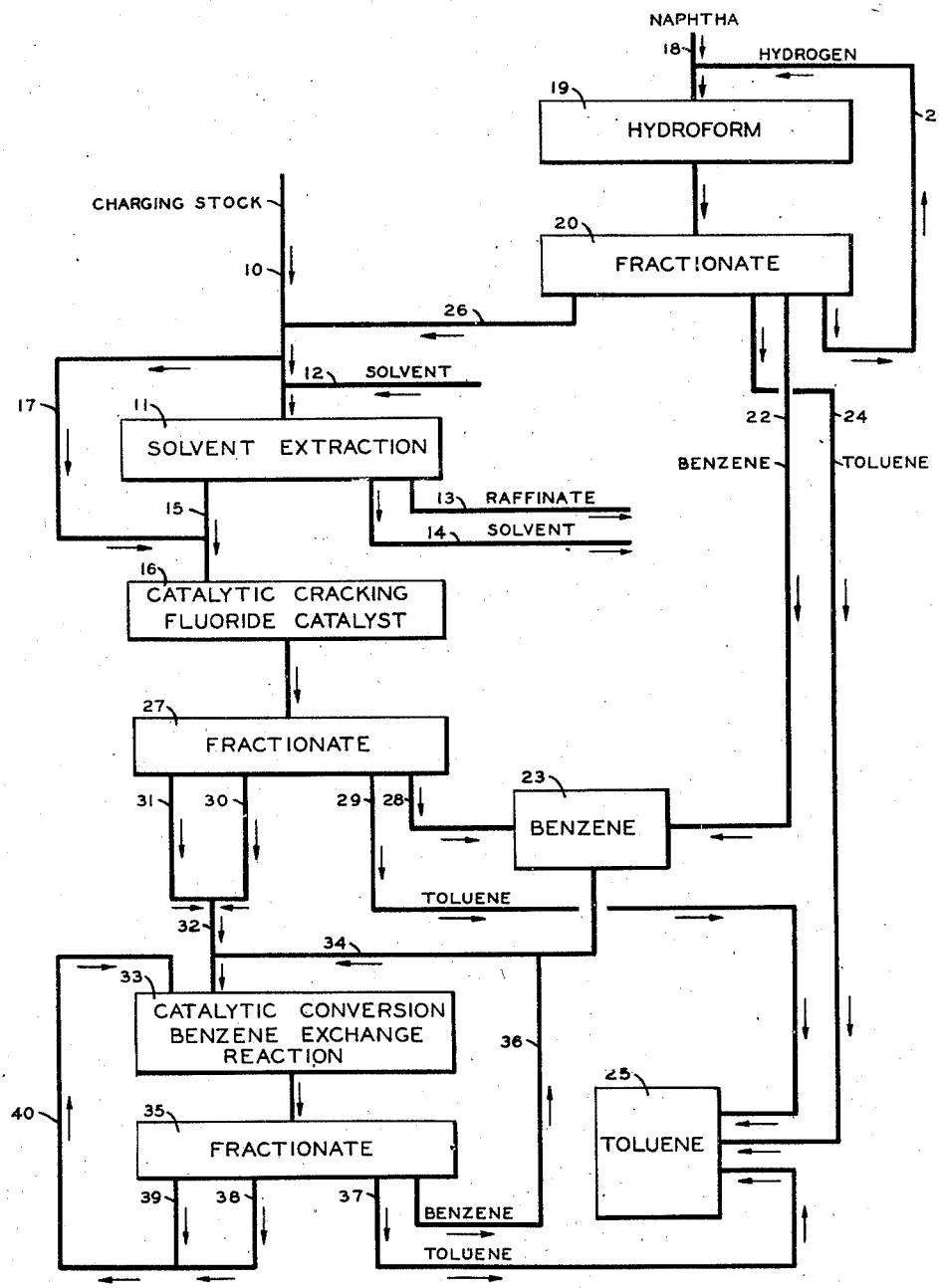

2,399,781

UNITED STATES PATENT OFFICE 2,399,781

MANUFACTURE OF TOLUENE

George B. Arnold, Beacon, N. Y., assignor to The Texas Company, New York, N. Y., a corporation of Delaware Application July 9, 1942, Serial No. 450,254

9 Claims. (Cl. 260—668)

This invention relates to the treatment of hydrocarbons, particularly petroleum hydrocarbons, for the production of toluene.

The invention is concerned with a process in which higher boiling aromatic hydrocarbons in the presence of benzene and in contact with a suitable catalyst are subjected to a conversion involving an exchange reaction between benzene and higher boiling aromatic hydrocarbons to form lower boiling aromatic hydrocarbons including toluene. The invention contemplates a process wherein hydrocarbon oil is subjected to treatment to effect conversion into aromatic hydrocarbons and wherein such aromatic hydrocarbons are subjected to the benzene exchange reaction to produce toluene.

The invention is based on the discovery that when aromatic hydrocarbons are subjected to cracking in the presence of certain fluoride catalysts a selective conversion to benzene occurs. The cracking in the presence of the fluoride catalyst operates to produce benzene for the exchange reaction in such quantity that the use of added benzene for the exchange reaction may be greatly reduced or, in fact, entirely eliminated.

In accordance with the invention aromatic hydrocarbons, or hydrocarbon oils rich in aromatic hydrocarbons, are subjected to cracking in contact with a metallic fluoride catalyst to effect conversion into lower boiling hydrocarbons including particularly relatively large proportions of benzene and the resultant catalytically cracked products, or fractions thereof including the benzene, are subjected to conversion in contact with a catalyst capable of catalyzing the benzene exchange reaction to produce toluene.

The catalytic conversion in the presence of the fluoride catalyst produces some toluene and in a preferred embodiment of the invention the catalytically cracked products are fractionated so as to separate fractions comprising benzene, toluene and higher boiling hydrocarbons and the benzene and higher boiling hydrocarbons or fractions thereof are combined for the exchange reaction conversion.

The invention further contemplates the treatment of petroleum stocks containing aromatic hydrocarbons with a selective solvent to obtain extracts rich in aromatic hydrocarbons, the cracking of such extracts in the presence of the fluoride catalyst to effect selective conversion to benzene and the exchange reaction conversion with the benzene to effect conversion to toluene.

Aluminum fluoride, magnesium fluoride and chromium fluoride may be mentioned as catalysts having the peculiar property of promoting the selective conversion to benzene. The fluoride is preferably dispersed on an adsorptive carrier such as an inorganic gel. The fluoride compound should be substantially non-volatile at the temperature required for the conversion or for the regeneration of the catalyst and generally speaking should be substantially non-volatile at temperatures under 1200° F. The pending application of Preston L. Veltman and Arthur R. Goldsby Serial No. 311,942, filed December 30, 1939, discloses certain catalysts adapted for the practice of the invention. This application discloses certain catalysts including magnesium fluoride, aluminum fluoride and silica having a magnesium fluoride content of 2% by weight and an aluminum fluoride content in the form of the hemi-hydrate amounting to 6% by weight; a chromium fluoride-silica catalyst containing 10% chromous fluoride; a magnesium fluoride-alumina-silica catalyst containing 10% magnesium fluoride; an aluminum fluoride-magnesia catalyst containing about 20% aluminum fluoride (hemi-hydrate), and Super Filtrol combined with 10% aluminum fluoride hemi-hydrate. Catalysts suitable for the practice of the invention are also disclosed in the pending applications of Preston L. Veltman Serial No. 311,942, filed December 30, 1939, and Serial No. 379,483, filed February 18, 1941. These applications disclose certain catalysts including silica and alumina with hydrated aluminum fluoride dispersed thereon, silica and alumina with aluminum fluoride and a magnesium compound such as magnesium fluoride dispersed thereon. The applications disclose specifically catalysts which upon analysis show 50–95 parts by weight silica, 1–20 parts alumina, 1–20 parts aluminum fluoride (hydrated) and 1–20% magnesia. Additional catalysts suitable for the invention are disclosed in the pending application of Preston L. Veltman Serial No. 313,759, filed January 13, 1940, now Patent 2,301,913, which discloses certain catalysts including aluminum phosphate having dispersed thereon aluminum fluoride, magnesium fluoride or chromium fluoride. The pending applications referred to contain detailed disclosures of the catalysts and reference may be had thereto for detailed descriptions of the catalysts and the methods of preparing them. The catalysts employed in my invention may be in the form of stationary or moving beds of pulverulent or pelleted material through which the hydrocarbon vapors are passed or in a powdered or finely divided form used as a slurry or in suspension as in the so-called fluid type of catalytic cracking operation.

For the purpose of more fully describing the invention reference is had to the accompanying drawing which is a flow diagram illustrating diagrammatically a particular embodiment of the invention.

Charging stock such as higher boiling products, particularly gas oils, obtained from either thermal or catalytic cracking, or other petroleum stock containing material quantities of higher boiling aromatic hydrocarbons, is introduced through line 10 to a solvent extract step 11. In this step the charging stock is treated with a selective solvent for aromatics such, for example, as water, phenol or furfural, introduced through line 12. The raffinate and solvent are separated from the aromatic extract, the raffinate being withdrawn through line 13 and the solvent withdrawn through line 14, while the aromatic fraction is directed through a line 15 to a catalytic cracking step 16.

When the charging stock contains a very high concentration of aromatic hydrocarbons the solvent extraction step may be dispensed with and the charging stock passed through a by-pass line 17 directly to the catalytic cracking step 16.

A suitable stock for charging to the catalytic cracking step 16 may be prepared by subjecting a gasoline or naphtha stock, particularly a straight run stock, to a conversion treatment in contact with a dehydrogenating catalyst in the presence of hydrogen to thereby effect an increase in the aromatic content. The gasoline or naphtha to be treated in this way may be introduced through a line 18 to a conversion step 19. In this step of the process the gasoline hydrocarbons are raised to a conversion temperature of about 900° F.–1000° F. and contacted with a catalyst such as molybdena-alumina and chrome-alumina while in the presence of hydrogen under superatmospheric pressures such as 200–400 p. s. i. The reactions taking place in this conversion operation are somewhat complex, but in general it may be said that naphthenic hydrocarbons are dehydrogenated to yield aromatics, paraffins are dehydrogenated to yield olefins and aromatics, olefins are cyclicized to aromatics. There is also a conversion of paraffins, particularly at the higher conversions, to lighter liquid hydrocarbons and gas, with usually, however, only a moderate increase in volatility. The charging stock may be said to be hydroformed into a product of increased aromaticity and octane number. The aromatic content of the product will ordinarily exceed 40%. Under the conditions of the operation there is no net consumption of hydrogen, in fact, the dehydrogenating reactions taking place will usually result in a net production of hydrogen.

The products of the hydroforming step pass to a fractionating zone 20 wherein they are subjected to the fractionation desired. Since there is an excess of hydrogen produced in the hydroforming reactions the hydrogen may be recovered and recycled through line 21 to the hydroforming step 19. It is satisfactory to obtain by fractionation a fraction consisting largely of hydrogen and methane and to recycle this fraction through line 21 to the hydroforming step 19. Certain quantities of benzene and toluene are produced in the hydroforming operation and these products may be recovered in the fractionation. Benzene, or a benzene containing fraction is withdrawn through a line 22 and directed to a tank 23 and toluene or a toluene containing fraction is withdrawn through line 24 and conducted to a tank 25. Normally all of the hydroformate boiling above toluene or boiling above about 250° F. (except possibly the residual or polymer fraction which ordinarily constitutes no more than 1–2% of the reaction products) is directed to the catalytic cracking step 16. This higher boiling fraction of the reformate may be conducted by a line 26 to the line 10 so that it may be passed through the by-pass line 17 directly to the catalytic cracking step 16 or through the line 10 to the solvent extraction step 11. The aromatic content of this high boiling fraction of the hydroformate will ordinarily approximate 60%–80% by weight which is a sufficiently high concentration of aromatics that the solvent extraction step may generally be omitted.

The hydrocarbon oil rich in aromatics which is directed to the catalytic cracking step 16 is raised to cracking temperatures of the order of 900° F.–1050° F. and contacted with the fluoride catalyst so as to effect the conversion of higher boiling hydrocarbon oils into lower boiling products with selective conversion to benzene. In this conversion high boiling aromatics containing relatively high molecular weight alkyl side chains are converted into lower boiling aromatics including benzene. While there is a pronounced tendency toward the formation of benzene there is also a conversion of the higher boiling aromatics into aromatics of intermediate boiling range such as the xylenes. The operation thus not only increases the production of benzene adapted for the subsequent benzene exchange reaction but also increases the quantity of aromatic hydrocarbons of intermediate boiling range which are most effective with benzene in the exchange reaction.

The conversion products of the catalytic cracking step 16 pass to a fractionating step 27 wherein the products are subjected to fractionation. A benzene cut may be directed through a line 28 to the benzene tank 23 and a toluene cut directed through a line 29 to the toluene tank 25, while a higher boiling condensate may be withdrawn through a line 30 and a residual fraction withdrawn through a line 31. If desired, the entire higher boiling product higher boiling than toluene may be directed to the subsequent conversion and exchange reaction, or the residual product as withdrawn through line 31 may be diverted from the process and only the condensate fraction passing through line 30 directed to the subsequent exchange reaction step. An advantageous operation is to withdraw a relatively narrow boiling range cut through line 30 such for example as a fraction boiling within a range of about 250° F.–310° F. Such a cut will contain the xylenes which are more effective in the exchange reaction with the benzene to produce toluene than higher boiling aromatics, since the xylenes by reacting molecule for molecule with benzene produce two molecules of toluene, while the higher boiling aromatics react molecule for molecule with benzene to give one molecule of toluene.

Higher boiling products obtained from the catalytic cracking step with the fluoride catalyst, or such fractions thereof as desired, pass through line 32 to a catalytic conversion and benzene reaction step 33. Benzene from the benzene tank 23 is passed through a line 34 and combined with the higher boiling hydrocarbons passing to the benzene exchange step 33.

The mixture of benzene and higher boiling hydrocarbons is raised to conversion temperatures of the order of 800° F.–1000° F. and contacted with catalytic material adapted to promote conversion of higher boiling hydrocarbons into lower boiling ones as well as to promote an exchange reaction between benzene and higher boiling aromatic hydrocarbons to form toluene. Certain synthetic silica-alumina and aluminum-containing catalysts are adapted to catalyze these reactions. A synthetic silica-alumina catalyst prepared by precipitating a mixed gel of silica and alumina is particularly adapted for this purpose. The silica-alumina catalyst may contain additional reactive agents such as zirconia and thoria. The fluoride catalysts, previously mentioned as adapted for promoting the selective conversion to benzene, are also adapted to promote the exchange reaction with benzene to form toluene. Catalysts which are adapted to promote the benzene exchange reaction are disclosed in a joint application filed by Robert E. Conary and applicant concurrently herewith, and reference is made to that application for a detailed description of the catalysts and for the method of preparing them. Space velocities of the order of 0.1 up to 5.0–10.0 may be employed, the space velocity being defined as the liquid volume per hour per space volume of catalyst. The operation may be carried on under a wide range of pressure such as relatively low pressures of the order of 50–200 p. s. i. up to higher pressures such as 400–600 p. s. i. or even higher pressures. In the reactions occurring in the presence of the catalyst and the benzene higher boiling hydrocarbons are converted into lower boiling hydrocarbons, polyalkyl aromatic hydrocarbons being converted to lower boiling aromatic hydrocarbons, and an exchange reaction takes place between the benzene and certain of the aromatic hydrocarbons, particularly aromatics of intermediate boiling range, to effect the formation of toluene. The operation is characterized by the overall disappearance of higher boiling aromatics accompanied by a net conversion into toluene and consumption of benzene.

The reaction products pass to a fractionating step 35 wherein the products are fractionated to separate benzene and toluene fractions from other low boiling products of the reaction. Benzene or a benzene containing fraction is withdrawn through a line 36 by which it may be recycled to the catalytic conversion and benzene exchange reaction step 33. Toluene or toluene containing fraction is withdrawn through line 37 and directed to the toluene tank 25. The constituents higher boiling than toluene may be withdrawn from the process or recycled to the benzene exchange reaction step 33. It is advantageous to separate a fraction of intermediate boiling range, which may be withdrawn through a line 38, from higher boiling or residual fractions withdrawn through a line 39. Either or both of these fractions may be recycled through a line 40 to the conversion step 33. The intermediate fraction preferably has a boiling range of about 250° F.–310° F. so as to include the xylenes which, as has been stated, are especially effective in the exchange reaction with benzene. The recycling of constituents which are of higher boiling point than such intermediate fraction to the conversion step 33 is, however, of advantage also since these higher boiling hydrocarbons are converted into lower boiling hydrocarbons which are effective in the production of toluene. The higher boiling fraction withdrawn through line 39 may with advantage be recycled to the fluoride catalytic cracking step 16, while the intermediate fraction containing the xylenes, withdrawn through line 38, may be recycled to the benzene exchange reaction step 33.

The toluene collected in tank 25 may be subjected to treatment with sulfuric acid to effect removal of any olefins present and may be given such further fractionation or solvent treatment as may be necessary in order to produce a toluene product of sufficient purity for nitration purposes.

In a typical example of the invention a straight run naphtha stock of 51 A. P. I. gravity and having an initial point of 220° F. and an end point of 432° F. (A. S. T. M. distillation) is passed through a heating coil and heated to a temperature of 990° F., the heated naphtha is combined with recycled hydrogen-containing gases heated to 1165° F. and the mixture at a temperature of 1040° F. is directed to a catalyst chamber containing an alumina-molybdena catalyst. The catalyst chamber is under a superatmospheric pressure of 310 p. s. i. and is maintained at an average temperature of 900° F.

The function of the fluoride catalyst in promoting the selective conversion to benzene is shown by taking a fraction (boiling from 268° F.–412° F.) from the products of the hydroforming operation just described and comparing the yield of benzene obtained by cracking with the fluoride catalyst with that obtained by cracking with a synthetic silica-alumina-zirconia catalyst, the latter being a highly superior cracking catalyst. In cracking the hydroformate fraction by heating it to 950° F. and contacting it with the silica-alumina-zirconia catalyst under a superatmospheric pressure of 400 p. s. i. the yield of benzene is 0.9%. In cracking the hydroformate fraction under the same conditions of temperature and pressure in contact with an alumina-silica-magnesia-aluminum fluoride catalyst the yield of benzene is 7.1%.

The products higher boiling than toluene obtained in the cracking with the alumina-silica-magnesia-aluminum fluoride catalyst or a fraction thereof, such as a cut containing the xylenes, is combined with the benzene fraction obtained from such cracking operation, as well as with the benzene from the hydroforming step, and the mixture of benzene and higher boiling hydrocarbons is heated to a temperature of 950° F. and passed through a second catalyst chamber containing a synthetic silica-alumina-zirconia catalyst maintained under 400 p. s. i. at a space velocity of 1.1 v./v./hr. to effect conversion into lower boiling hydrocarbons as well as to produce an exchange reaction between benzene and higher boiling aromatics to produce toluene.

In the benzene exchange reaction step the benzene may be added to the higher boiling stock at a ratio of about 0.2–8.0 volumes of benzene to 1 volume of the higher boiling stock. When employing the lower proportions of benzene, and particularly when delivering to the benzene exchange reaction step only the intermediate boiling fraction or xylene cut from the preceding catalytic cracking step, the entire amount or at least the greater portion of the required benzene may be obtained from such catalytic cracking step so that no extraneous benzene, or at least minimum quantities thereof, need be supplied. When using the higher benzene ratios, it is necessary to add quantities of extraneous benzene. In an operation without recycling benzene about 20% of the benzene is consumed in the exchange reaction step. When fractionating the conversion products from the benzene exchange reaction step to obtain a benzene fraction and when recycling this fraction to the benzene reaction conversion zone the amount of make-up benzene required is considerably reduced.

In a modification of the invention the catalytic cracking step 16 and the benzene exchange reaction step 33 may be combined in a single reaction zone by using therein a catalyst adapted to promote both the conversion of higher boiling aromatics into benzene and the exchange reaction of benzene with higher boiling aromatics to produce toluene. For example, the catalyst chamber may be charged with a mixture of a metallic fluoride catalyst and a synthetic silica-alumina catalyst. It is preferred, however, to carry on the two operations in separate steps as has been specifically described herein.

Obviously many modifications and variations of the invention, as hereinbefore set forth, may be made without departing from the spirit and scope thereof, and therefore only such limitations should be imposed as are indicated in the appended claims.

I claim:

1. In the manufacture of toluene the process that comprises subjecting charging stock comprising higher boiling aromatic hydrocarbons to cracking temperature in contact with a metallic fluoride catalyst to thereby effect a conversion into lower boiling aromatic hydrocarbons involving selective conversion to benzene, and subjecting resultant catalytically cracked products comprising benzene and higher boiling aromatic hydrocarbons to conversion temperature in contact with a catalyst adapted to catalyze both a conversion into lower boiling products and an exchange reaction between benzene and higher boiling aromatic hydrocarbons to form toluene.

2. In the manufacture of toluene the process that comprises subjecting charging stock comprising higher boiling aromatic hydrocarbons to cracking temperature in contact with a metallic fluoride catalyst to thereby effect a conversion into lower boiling aromatic hydrocarbons involving selective conversion to benzene, fractionating resultant catalytically cracked products to obtain fractions comprising benzene, toluene and higher boiling hydrocarbons including aromatic hydrocarbons, combining such higher boiling hydrocarbons with the benzene and subjecting the mixture to conversion temperature in contact with a catalyst adapted to catalyze both a conversion into lower boiling products and an exchange reaction between benzene and high boiling aromatic hydrocarbons to form toluene.

3. In the manufacture of toluene the process that comprises subjecting charging stock comprising higher boiling aromatic hydrocarbons to cracking temperature in contact with a metallic fluoride catalyst to thereby effect a conversion into lower boiling aromatic hydrocarbons involving selective conversion to benzene, fractionating resultant catalytically cracked products to obtain fractions comprising benzene, toluene and higher boiling hydrocarbons including aromatic hydrocarbons, combining such higher boiling hydrocarbons with the benzene and subjecting the mixture to conversion temperature in a conversion zone in contact with a catalyst adapted to catalyze both a conversion into lower boiling products and an exchange reaction between benzene and higher boiling aromatic hydrocarbons to form toluene, fractionating resultant products of conversion to obtain fractions comprising benzene, toluene and higher boiling hydrocarbons and recycling the benzene fraction to said conversion zone.

4. In the manufacture of toluene the process that comprises subjecting charging stock comprising higher boiling aromatic hydrocarbons to cracking temperature in contact with a metallic fluoride catalyst to thereby effect a conversion into lower boiling aromatic hydrocarbons involving selective conversion to benzene, fractionating resultant catalytically cracked products to obtain fractions comprising benzene, toluene, xylene and higher boiling hydrocarbons, combining the benzene and xylene fractions and subjecting the mixture to conversion temperature in a conversion zone in contact with a catalyst adapted to catalyze both a conversion into lower boiling products and an exchange reaction between benzene and higher boiling aromatic hydrocarbons to form toluene, fractionating resultant products of conversion to obtain fractions comprising benzene, toluene and xylene and recycling the benzene and xylene fractions to said conversion zone.

5. In the manufacture of toluene the process that comprises treating hydrocarbon oil containing higher boiling aromatic hydrocarbons with a selective solvent to effect the extraction of aromatic hydrocarbons, subjecting the extracted aromatic hydrocarbons to cracking temperature in contact with a metallic fluoride catalyst to thereby effect a conversion into lower boiling aromatic hydrocarbons involving selective conversion to benzene and subjecting resultant catalytically cracked products comprising benzene and higher boiling aromatic hydrocarbons to conversion temperature in contact with a catalyst adapted to catalyze both a conversion into lower boiling products and an exchange reaction between benzene and higher boiling aromatic hydrocarbons to form toluene.

6. In the manufacture of toluene the process that comprises subjecting a petroleum stock to catalytic aromatization, subjecting resultant aromatic hydrocarbons to cracking temperature in contact with a metallic fluoride catalyst to thereby effect a conversion into lower boiling aromatic hydrocarbons involving selective conversion to benzene and subjecting resultant catalytically cracked products comprising benzene and higher boiling aromatic hydrocarbons to conversion temperature in contact with a catalyst adapted to catalyze both a conversion into lower boiling products and an exchange reaction between benzene and higher boiling aromatic hydrocarbons to form toluene.

7. In the manufacture of toluene the process that comprises subjecting a petroleum naphtha stock to conversion in a hydroforming zone in the presence of hydrogen and in contact with a dehydrogenating and a cyclicizing catalyst to effect aromatization, fractionating the resultant aromatized products to separate lower boiling hydrocarbons from a higher boiling fraction containing aromatic hydrocarbons, directing said higher boiling fraction to a second conversion zone wherein it is subjected to a cracking temperature in contact with a metallic fluoride catalyst to effect a conversion into lower boiling aromatic hydrocarbons involving selective conversion to benzene, fractionating the products of said catalytic cracking to obtain benzene and toluene fractions and a higher boiling fraction containing aromatic hydrocarbons, combining said higher boiling fraction with the benzene fraction and subjecting the mixture to conversion temperature in a third conversion zone in contact with a catalyst adapted to catalyze both a conversion into lower boiling products and an exchange reaction between benzene and higher boiling aromatic hydrocarbons to form toluene.

8. In the manufacture of toluene the process that comprises subjecting a petroleum naphtha stock to conversion in a hydroforming zone in the presence of hydrogen and in contact with a dehydrogenating and a cyclicizing catalyst to effect aromatization, fractionating the resultant aromatized products to separate lower boiling fractions comprising benzene and toluene from a higher boiling fraction containing aromatic hydrocarbons, directing said higher boiling fraction to a second conversion zone wherein it is subjected to a cracking temperature in contact with a metallic fluoride catalyst to effect a conversion into lower boiling aromatic hydrocarbons involving selective conversion to benzene, fractionating the products of said catalytic cracking to obtain benzene and toluene fractions and a higher boiling fraction containing aromatic hydrocarbons, combining said higher boiling fraction with said benzene fractions and subjecting the mixture to conversion temperature in a third conversion zone in contact with a catalyst adapted to catalyze both a conversion into lower boiling products and an exchange reaction between benzene and higher boiling aromatic hydrocarbons to form toluene.

9. In the manufacture of toluene the process that comprises subjecting a naphtha stock rich in aromatic hydrocarbons to cracking temperature in contact with a catalyst in the form of a synthetic composite of alumina, silica, magnesia and aluminum fluoride to thereby effect a conversion into lower boiling aromatic hydrocarbons involving selective conversion to benzene, fractionating the resultant catalytically cracked products to obtain benzene and toulene fractions and a higher boiling fraction containing aromatic hydrocarbons, combining the higher boiling fraction with the benzene fraction and subjecting the mixture to conversion in contact with a catalyst in the form of a synthetic composite of precipitated silica and alumina to thereby effect conversion into lower boiling hydrocarbons and effect an exchange reaction between benzene and higher boiling aromatics to produce a net consumption of benzene and selective formation of toluene with a net reduction in aromatic hydrocarbons higher boiling than the xylenes.

GEORGE B. ARNOLD.